(12) United States Patent
Yamaguchi

(10) Patent No.: US 11,413,959 B2
(45) Date of Patent: Aug. 16, 2022

(54) VEHICLE BODY SIDE STRUCTURE

(71) Applicant: HONDA MOTOR CO., LTD., Tokyo (JP)

(72) Inventor: Natsumi Yamaguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 345 days.

(21) Appl. No.: 16/824,233

(22) Filed: Mar. 19, 2020

(65) Prior Publication Data

US 2020/0307374 A1 Oct. 1, 2020

(30) Foreign Application Priority Data

Mar. 28, 2019 (JP) .............................. JP2019-065053

(51) Int. Cl.
| | |
|---|---|
| *B60K 15/05* | (2006.01) |
| *B62D 25/24* | (2006.01) |
| *B62D 25/02* | (2006.01) |
| *B60K 15/04* | (2006.01) |

(52) U.S. Cl.
CPC ............. *B60K 15/05* (2013.01); *B62D 25/24* (2013.01); *B60K 2015/0474* (2013.01); *B62D 25/02* (2013.01)

(58) Field of Classification Search
CPC ............... B60K 15/05; B60K 15/0507; B60K 15/0515; B60K 15/053; B60K 15/0553; B62D 25/02; B62D 25/24
USPC ...................................................... 296/97.22
See application file for complete search history.

(56) References Cited

U.S. PATENT DOCUMENTS

| | | | | | |
|---|---|---|---|---|---|
| 2,258,812 | A | * | 10/1941 | Ross ....................... | B60K 15/05 280/853 |
| 6,092,855 | A | * | 7/2000 | Rezzonico ............... | B60J 5/101 296/97.22 |
| 2012/0299334 | A1 | | 11/2012 | Takayama et al. | |
| 2016/0264184 | A1 | | 9/2016 | Ishihara | |
| 2016/0325790 | A1 | | 11/2016 | Murray et al. | |

FOREIGN PATENT DOCUMENTS

| | | | | |
|---|---|---|---|---|
| CN | 1836928 | A | | 9/2006 |
| CN | 102741110 | A | | 10/2012 |
| CN | 203237299 | U | | 10/2013 |
| CN | 105636857 | A | | 6/2016 |
| CN | 105722750 | A | | 6/2016 |
| DE | 19933512 | A1 | | 1/2001 |
| EP | 1462284 | A2 * | 9/2004 | .............. B60J 1/10 |
| JP | 2004-136738 | A | | 5/2004 |
| JP | 2008-062896 | A | | 3/2008 |
| JP | 5229184 | B2 | | 7/2013 |

OTHER PUBLICATIONS

Office Action received in corresponding CN application No. 202010194063.0 dated Feb. 9, 2022 with English translation (13 pages).

* cited by examiner

*Primary Examiner* — Dennis H Pedder
(74) *Attorney, Agent, or Firm* — Rankin, Hill & Clark LLP

(57) ABSTRACT

A vehicle body side structure includes a lid openably and closably attached to a side surface of a vehicle body rear part, and a quarter window provided at a position rearward of a rear door opening. A gap extending in a front-rear direction of a vehicle body is formed by an upper side of the lid extending in the front-rear direction of the vehicle body and a lower side of the quarter window extending in the front-rear direction of the vehicle body.

10 Claims, 6 Drawing Sheets

VEHICLE BODY SIDE STRUCTURE

BACKGROUND OF THE INVENTION

1. Field of the Invention

The present invention relates to a vehicle body side structure.

2. Description of the Related Art

There has been known a vehicle body side structure in which a fuel lid is aligned with a rear light such that a rear side of the fuel lid extends along a front side of the rear light at a vehicle body side part (see Patent Literature 1, for example). This vehicle body side structure can create a design that emphasizes a unified texture of the rear light and the lid in lateral view of a vehicle body.

Meanwhile, there has also been known a vehicle body side structure in which a lid is disposed between a quarter window and a rear light in a front-rear direction of a vehicle body (see Patent Literature 2, for example).

PRIOR ART DOCUMENT(S)

Patent Literature(s)

Patent Literature 1: DE 19933512 A1
Patent Literature 2: JP 5229184 B2

SUMMARY OF THE INVENTION

In the meantime, these conventional vehicle body side structures (see Patent Literatures 1 and 2, for example) may possibly be combined together in such a way as to form a front side of a rear light and a rear side of a lid in alignment at a position rearward of a quarter window for the purpose of enriching the design.

However, such a vehicle body side structure may increase air resistance when the vehicle is moving because parting lines of the lid and of the quarter window are formed separately from and independently of each other.

An object of the present invention is to provide a vehicle body side structure which is capable of reducing air resistance when a vehicle is moving while improving a design of the vehicle at the same time.

To attain the object, a vehicle body side structure of the present invention includes a lid openably and closably attached to a side surface of a vehicle body rear part, and a quarter window provided at a position rearward of a rear door opening. Here, a gap extending in a front-rear direction of a vehicle body is formed by an upper side of the lid extending in the front-rear direction of the vehicle body and a lower side of the quarter window extending in the front-rear direction of the vehicle body.

According to the vehicle body side structure of the present invention, it is possible to reduce air resistance when a vehicle is moving while improving a design of the vehicle at the same time.

DETAILED DESCRIPTION OF THE EMBODIMENTS

Next, a vehicle body side structure according to a mode of carrying out the present invention (an embodiment) will be described in detail while referring to the accompanying drawings as appropriate.

A main feature of a vehicle body side structure of this embodiment lies in a gap, which is formed by an upper side of a lid and a lower side of a quarter window and extends in a front-rear direction of a vehicle body.

This embodiment specifically describes the present invention while exemplifying a vehicle body side structure provided with a lid disposed on a left side surface and configured to cover a fuel filler opening. Nonetheless, the present invention is not limited only to the lid of this configuration but is also applicable to a vehicle body side structure for an electric vehicle provided with a power feed port, a power charge port or the like. Meanwhile, the vehicle body side structure may be provided with such a lid on a right side surface of the vehicle body. Moreover, assuming a case of locating a fuel filler opening and a power charge port, respectively, on right and left sides of a plug-in hybrid vehicle, for example, the lids may also be disposed on both the right and left side surfaces of the vehicle body. Incidentally, the vehicle body side structure provided with the lid on the right side surface has a structure which is symmetrical to the vehicle body side structure of the embodiment described below. Upper and lower, front and rear, and right and left directions in the following description coincide with upper and lower, front and rear, and right and left directions of the vehicle body. Note that the left side in each drawing indicates an outer side in a vehicle width direction while the right side therein indicates an inner side in the vehicle width direction.

Figure 1:
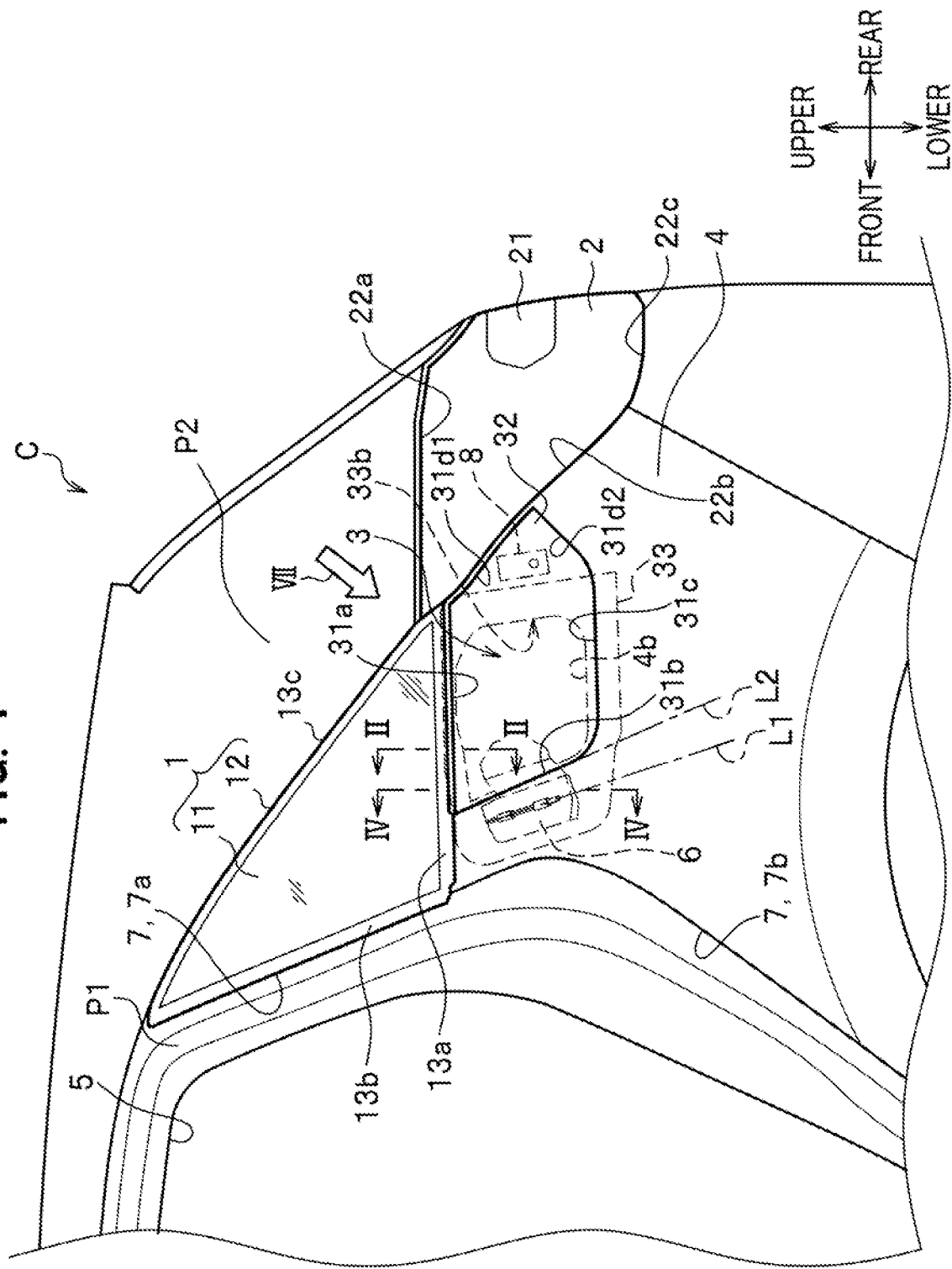
FIG. 1 is a diagram to explain a configuration of a vehicle body side structure according to an embodiment of the present invention.

FIG. 1 is a diagram to explain a configuration of a vehicle body side structure C of this embodiment. To be more precise, FIG. 1 is a partially enlarged side view of a left side of a rear part of the vehicle body.

Note that an adapter 33 and a hinge 6 for a lid 3 to be described later, which are disposed on a back side of an outer panel 4 (the inner side in the vehicle width direction), are illustrated with hidden lines (dashed lines) in FIG. 1. Meanwhile, reference sign 4b denotes an adapter opening formed in the outer panel 4 on an inner side of the lid 3. This adapter opening 4b causes part of the adapter 33 disposed on the inner side of the outer panel 4 to face the outer side in the vehicle width direction. In the meantime, reference sign 8 denotes a push lifter attached to the outer side of the outer panel 4. The adapter opening 4b and the push lifter 8 are also illustrated with hidden lines (dashed lines) in FIG. 1.

As shown in FIG. 1, the vehicle body side structure C includes a quarter window 1, a rear light 2, and the lid 3.

<Quarter Window>

As shown in FIG. 1, the quarter window 1 of this embodiment is disposed rearward of a rear door opening 5. Incidentally, the rear door opening 5 of this embodiment has a rear edge 7 that forms a gap with a parting line of a not-illustrated rear door when the rear door opening 5 is closed with the rear door. This rear edge 7 is bent into an arch as its vertical central part backs away, and includes an upper rear edge 7a and a lower rear edge 7b that are located above and below the vertical central part.

In other words, the quarter window 1 is disposed rearward of the upper rear edge 7a of the rear door opening 5.

The above-described quarter window 1 is disposed in such a way as to block a triangular region surrounded by an upper edge of the outer panel 4, a rear edge of a rear quarter pillar P1, and a front edge of a rear pillar P2 collectively constituting a side surface of a vehicle body rear part in lateral view of the vehicle body.

A planar shape of the above-described quarter window 1 takes on a triangular shape defined by a lower side 13a, a front side 13b, and a rear side 13c so as to correspond to the aforementioned triangular region. Specifically, the quarter window 1 takes on an obtuse triangle in which an angle between the lower side 13a extending in the front-rear direction of the vehicle body and the front side 13b extending obliquely upward from a front end of the lower side 13a is formed into an obtuse angle.

The above-mentioned quarter window 1 includes a quarter glass member 11 in a triangular shape which forms a body of the quarter window 1, and a molding member 12 that trims a periphery of this quarter glass member 11.

The shape of the quarter glass member 11 takes on a substantially similar shape to the obtuse triangle of the quarter window 1, which is slightly smaller as a consequence of subtracting a width of the molding member 12 from the quarter window 1.

Figure 2:
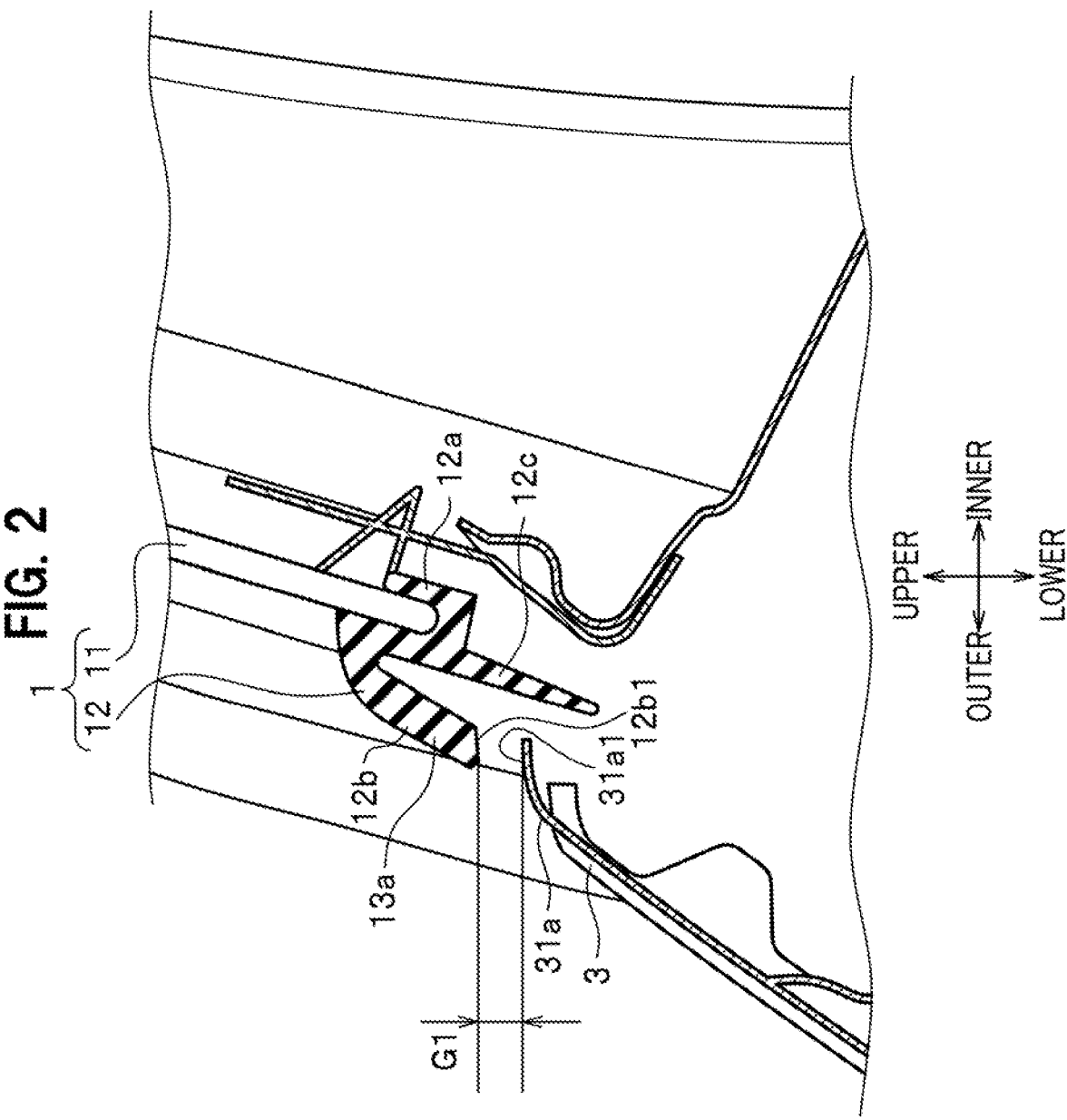
FIG. 2 is a cross-sectional view taken along the II-II line in FIG. 1.

FIG. 2 is a cross-sectional view taken along the II-II line in FIG. 1, which is a diagram including a cross-section of the molding member 12 that forms the lower side 13a (see FIG. 1) of the quarter window 1.

As shown in FIG. 2, the molding member 12 includes a substantially U-shaped pinching portion 12a that pinches and supports the periphery of the quarter glass member 11, and a lip portion 12b located on the outer side in the vehicle width direction and extending obliquely downward and outward from the pinching portion 12a.

This lip portion 12b extends outward from an upper end on the outer side of an open side of the U-shaped portion that constitutes the pinching portion 12a, and then extends further while changing its direction obliquely downward and outward in the middle.

A lower end surface 12b1 of the above-described lip portion 12b of this embodiment is made substantially horizontal in the vehicle width direction. Moreover, the lower end surface 12b1 of the lip portion 12b is opposed to an upper surface 31a1 of an upper side 31a of the lid 3 to be described later.

The above-mentioned lower end surface 12b1 of the lip portion 12b forms a parting line of the quarter window 1 at the lower side 13a of the quarter window 1.

Moreover, the molding member 12 includes an extending portion 12c.

This extending portion 12c is formed in such a way as to extend downward from a lower corner on the outer side of the pinching portion 12a. Then, the extending portion 12c extends downward in such a way as to overlap on the inner side in the vehicle width direction with the upper side 31a of the lid 3. In other words, the extending portion 12c is located on the inner side in the vehicle width direction relative to the lip portion 12b and to the upper side 31a of the lid 3, and extends down below the upper side 31a of the lid 3.

As will be described in detail later, the above-mentioned extending portion 12c of this embodiment is formed at a portion of the molding member 12 so as to correspond to the upper side 31a of the closed lid 3 (see FIG. 3).

The molding member 12 of this embodiment is assumed to be formed from a rubber material such as foamed rubber and EPDM.

However, the material is not limited to the foregoing.

The above-described quarter window 1 is attached to an attachment opening 4a of the outer panel 4 to be described later (see FIG. 6).

<Rear Light>

Next, a description will be given of the rear light 2 (see FIG. 1).

Although illustration is omitted, the rear lights 2 of this embodiment are disposed at corner portions on both the right and left sides of the vehicle body rear part, respectively. To be more precise, the rear lights 2 are disposed across a rear surface and the side surface of the vehicle body.

As shown in FIG. 1, each rear light 2 is disposed while being integrated with a backup lamp 21 and more lamps not illustrated therein including a rear surface turn signal lamp, a rear surface hazard lamp, a brake lamp, a tail lamp, and so forth.

The rear light 2 of this embodiment includes an upper side 22a that extends in the front-rear direction, a front side 22b that extends obliquely downward and rearward from a front end of this upper side 22a, and a lower side 22c that extends rearward from a lower end of this front side 22b in lateral view of the vehicle body.

Moreover, the upper side 22a of the rear light 2 forms an upper parting line of the rear light 2 and a front end thereof is joined to a lower part of the rear side 13c of the quarter window 1.

Meanwhile, the front side 22b of the rear light 2 substantially coincides with a virtual extension line that extends downward of the rear side 13c of the quarter window 1.

<Lid>

Next, a description will be given of the lid 3 (see FIG. 1).

As shown in FIG. 1, the lid 3 in a closed state takes on a substantially pentagonal shape which is long in the front-rear direction in lateral view of the vehicle body.

Specifically, the lid 3 includes the upper side 31a that extends in the front-rear direction, a front side 31b that extends obliquely downward and rearward from a front end of the upper side 31a, and a lower side 31c that extends rearward from a lower end of this front side 31b. Moreover, the lid 3 includes an upper rear side 31d1 that extends obliquely downward and rearward from a rear end of the upper side 31a, and a lower rear side 31d2 that extends obliquely downward and forward from a lower end of this upper rear side 31d1 and is connected to a rear end of the lower side 31c.

The upper side 31a of the lid 3 is formed in line with the lower side 13a of the quarter window 1.

As shown in FIG. 2, the upper side 31a of the lid 3 is bent inward in the vehicle width direction whereby the upper surface 31a1 is made substantially horizontal in the vehicle width direction.

Accordingly, the upper surface 31a1 of the upper side 31a is opposed to the lower end surface 12b1 of the lip portion 12b of the molding member 12 that forms the quarter window 1 as mentioned above.

The above-described upper side 31a of the lid 3 is made substantially parallel to the lower side 31c as shown in FIG. 1.

The front side 31b of the lid 3 is made partially parallel to the upper rear edge 7a of the rear door opening 5 as shown in FIG. 1. The upper rear side 31d1 of the lid 3 is formed in line with the front side 22b of the rear light 2.

Meanwhile, unlike a front part of the lid 3, an expanded portion 32 of the lid 3 being disposed rearward of a rear end 33b of the adapter 33 to be described in detail later and extending toward the rear light 2 has a triangular region to be sandwiched between the upper rear side 31d1 and the lower rear side 31d2.

Moreover, the push lifter 8 is disposed on an inner side of this expanded portion 32 of the lid 3 to be described in detail later.

The above-described lid 3 is attached openably and closably to the outer panel 4 through the hinge 6 and the adapter 33.

Figure 3:
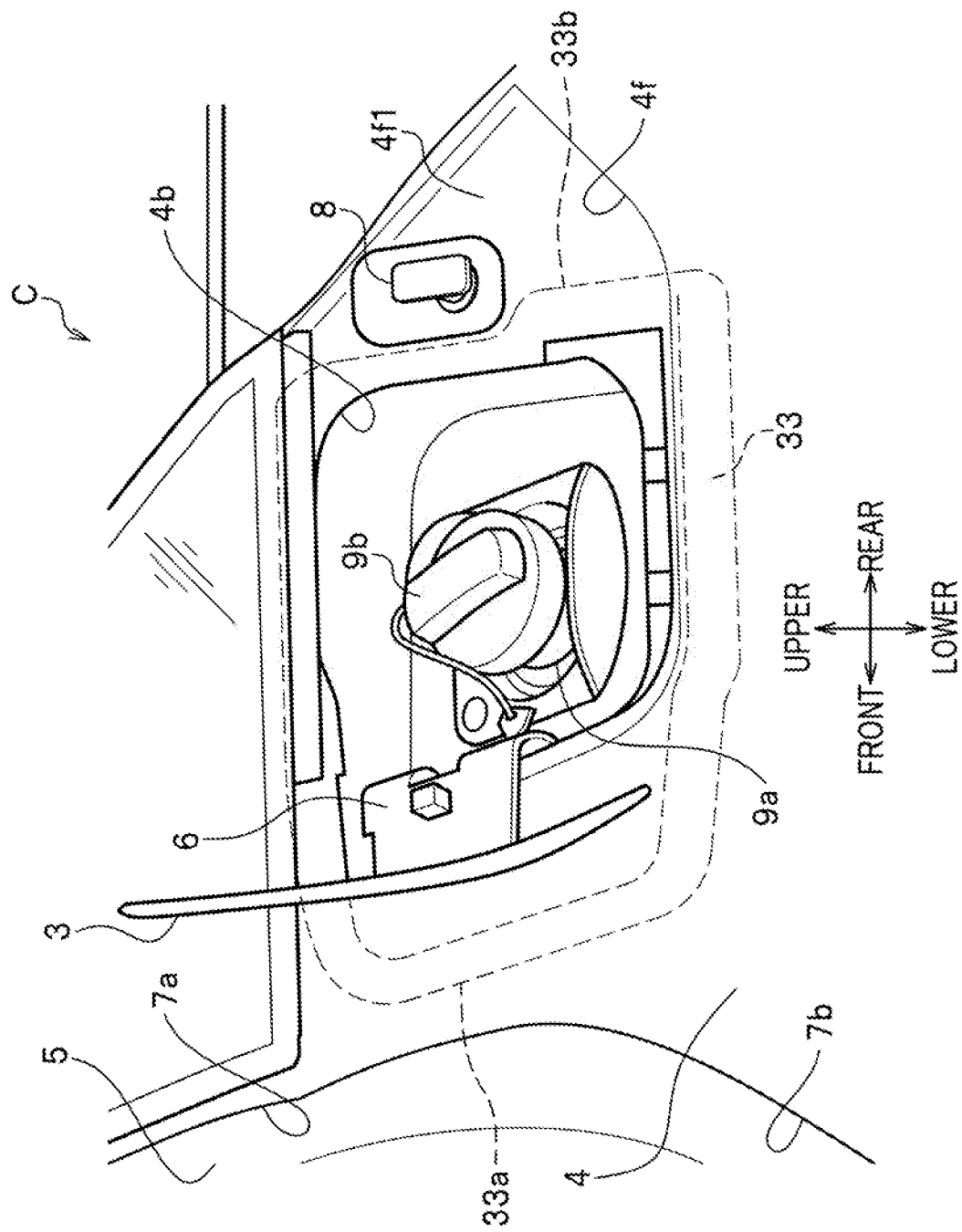
FIG. 3 is a partially enlarged perspective view of a vehicle body in a state where a lid of the vehicle body side structure is opened.

FIG. 3 is a partially enlarged perspective view of a vehicle body side part when the lid 3 is opened.

The adapter 33 disposed on the inner side of the outer panel 4 is illustrated with hidden lines (dashed lines) in FIG. 3. When the lid 3 is opened, this adapter 33 faces the outer side in the vehicle width direction (a front side of the sheet surface of FIG. 3) through the adapter opening 4b formed in the outer panel 4.

As shown in FIG. 3, the adapter opening 4b is formed substantially at the center of a lid locating portion 4f formed in the outer panel 4. Incidentally, the adapter opening 4b of this embodiment takes on a substantially rectangular shape. However, the shape of the adapter opening 4b is not limited to the foregoing.

Meanwhile, a filler cap 9b that is detachably attached to a fuel filler opening 9a faces the adapter opening 4b. Here, the fuel filler opening 9a will be attached to a fuel filler opening attachment hole 37 (see FIG. 5) of the adapter 33 to be described in detail later.

The lid locating portion 4f is formed into a substantially pentagonal shape corresponding to the planar shape of the lid 3 and such that the outer panel 4 is recessed inward in the vehicle width direction.

Moreover, the lid 3 is housed in the lid locating portion 4f when the adapter opening 4b is closed by turning the lid 3 around the hinge 6.

A nearly flat region 4/1 in a triangular shape so as to correspond to the expanded portion 32 (see FIG. 1) of the lid 3 is formed in the lid locating portion 4f at a position rearward of the rear end 33b of the adapter 33. The push lifter 8 is disposed in this nearly flat region 4/1.

Although illustration is omitted, the push lifter 8 of this embodiment includes a shaft member biased in a direction of projection from a surface part of the nearly flat region 4/1, and an elongate locking piece provided at a tip of the shaft member in such a way as to form a substantially T-shape in conjunction with this shaft member.

When the lid 3 is in an open state, the biased shaft member of this push lifter 8 projects from the surface part of the nearly flat region 4/1.

On the other hand, when the lid 3 is in a closed state, the shaft member of the push lifter 8 gets pushed by a back surface of the lid 3, thus retracting towards a back side of the nearly flat region 4/1 in such a way as to be pushed back against the biasing force.

Expanding and contracting actions of this shaft member are alternated by use of an alternate mechanism while generating a clicking feeling every time the shaft member is pressed.

Moreover, the shaft member in the case where the lid 3 is in the closed state is turned by some 90° about an axis relative to the shaft member in the state where the lid 3 is in the open state. In other words, the elongate locking piece is turned by about 90° when viewed in the axial direction.

Meanwhile, the lid 3 includes a catching plate at a position opposed to the shaft member of the push lifter 8 in the close state of the lid 3. This catching plate is provided with a long hole corresponding to the elongate locking piece of the push lifter 8. Moreover, the elongate locking piece is insertable into the long hole in the catching plate of the lid 3 in the open state.

In the above-described push lifter 8, the elongate locking piece of the push lifter 8 is fitted into the above-mentioned long hole in the lid 3 when the lid 3 is closed. Then, the back surface of the lid 3 presses the shaft member against the biasing force. The pressed shaft member generates the clicking feeling by use of the alternate mechanism while turning the elongate locking piece by about 90°, and maintains a state of contraction. In this instance, the locking piece turned by about 90° intersects with a longitudinal direction of the long hole into which the locking piece is inserted. Thus, the locking piece locks the catching plate of the lid 3. The lid 3 is maintained in the closed state.

Then, as shown in FIG. 2, the upper side 31a of the lid 3 in the closed state is located on the outer side in the vehicle width direction of the extending portion 12c of the molding member 12 that constitutes the quarter window 1.

In the meantime, although illustration is omitted, the lid 3 set in the closed state inside the lid locating portion 4f shown in FIG. 3 is made flush with the outer panel 4 around the lid locating portion 4f.

Next, when opening the lid 3, a user presses the lid 3 to the nearly flat region 4/1 side.

Hence, the shaft member stretches out with the biasing force while generating the clicking feeling by use of the alternate mechanism. The lid 3 is lifted up by the shaft member. Then, the shaft member turns the locking piece in reverse by about 90°. The elongate locking piece of the push lifter 8 can thus come out of the above-mentioned long hole in the lid 3.

As the user pulls up the lifted lid 3, the lid 3 is turned around the hinge 6 and is set to the open state.

Figure 4:
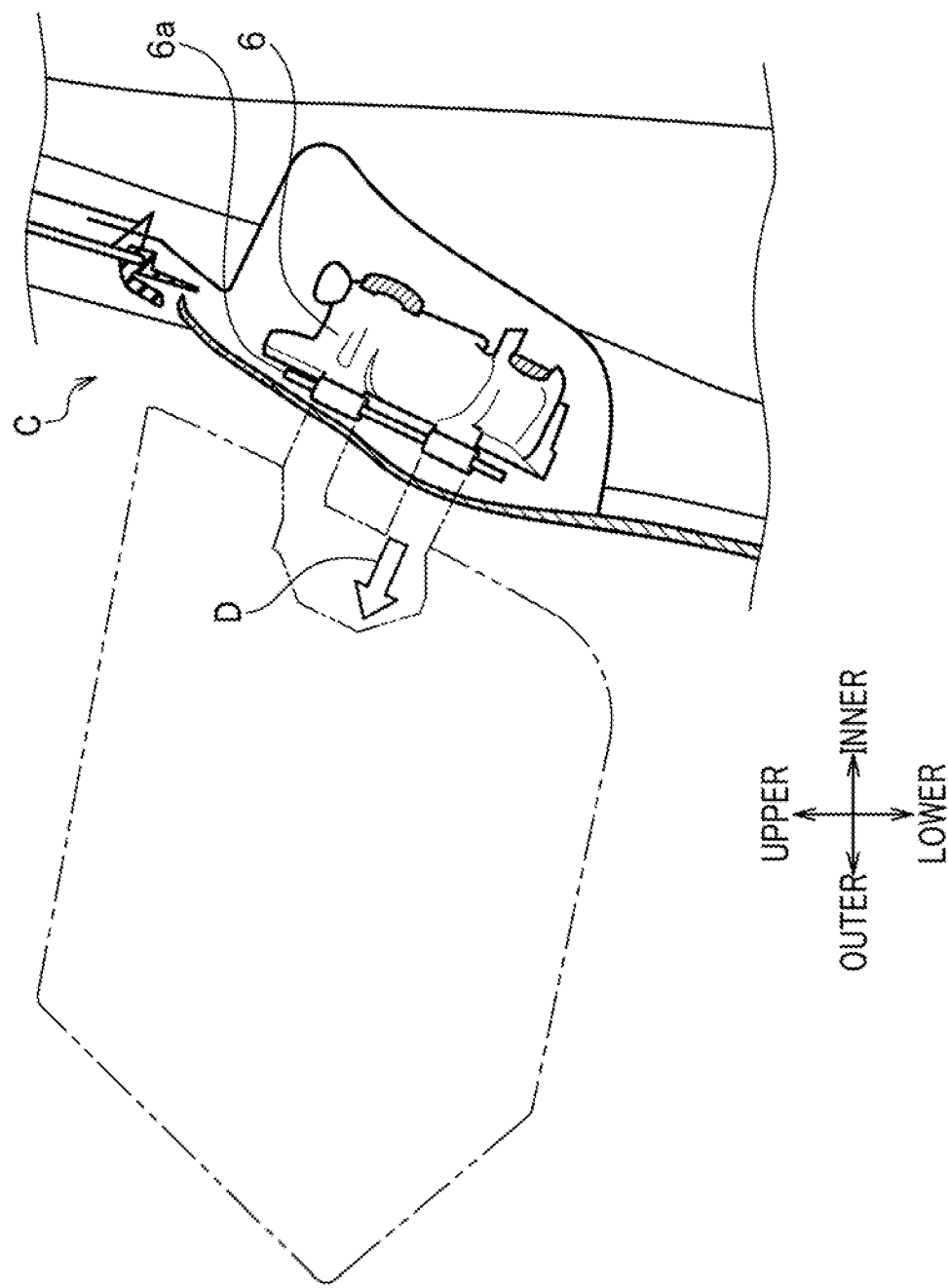
FIG. 4 is a cross-sectional view taken along the IV-IV line in FIG. 1.

FIG. 4 is a cross-sectional view taking along the IV-IV line in FIG. 1. Note that FIG. 4 illustrates part of an upper side of the lid 3 in the closed state with solid lines and the lid 3 in the open state with phantom lines (chain double-dashed lines).

As shown in FIG. 4, in terms of an up-down direction of the vehicle body, a portion of the outer panel 4 at a position corresponding to a lower part of the lid 3 bulges outward in the vehicle width direction more than an upper part of the lid 3 does.

Then, a spindle 6a of the hinge 6 is obliquely arranged in such a way as to cross a bulging direction D of the outer panel 4 substantially at a right angle in rear view of the vehicle body. In other words, the spindle 6a of the hinge 6 is inclined such that its lower side is displaced more outward in the vehicle width direction than its upper side does.

Meanwhile, as represented by an interval between a phantom line L1 and a phantom line L2 shown in FIG. 1, the spindle 6a of the hinge 6 is inclined such that a distance from the front side 31*b* of the lid 3 gradually grows larger downward in lateral view of the vehicle body.

Incidentally, the hinge 6 of this embodiment is attached to the adapter 33 and disposed forward of the adapter opening 4*b* and on the inner side in the vehicle width direction of the outer panel 4.

Figure 5:
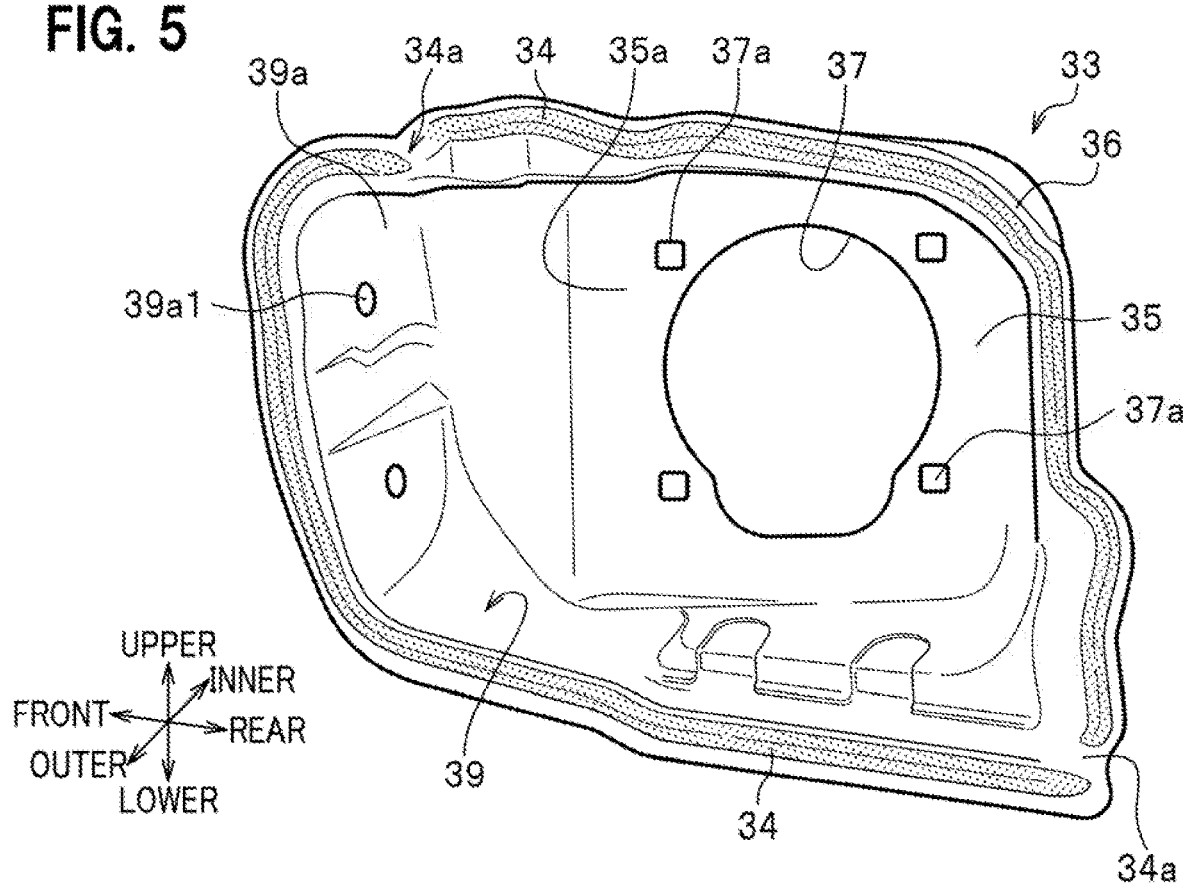
FIG. 5 is an overall perspective view of an adapter.

FIG. 5 to be referred to next is an overall perspective view of the adapter 33. FIG. 6 is a partially enlarged perspective view showing an aspect of the adapter 33 attached to a position corresponding to the adapter opening 4*b* that is provided to the outer panel 4.

As shown in FIG. 5, the adapter 33 is formed substantially into a box which is open outward in the vehicle width direction. Specifically, the adapter 33 includes an opening rim 36 connected to a back surface (a surface on the inner side in the vehicle width direction) of the outer panel 4 (see FIG. 3), and an adapter body portion 35 that forms a bottom surface 35*a* on the inner side in the vehicle width direction through a side wall 39 connected to this opening rim 36.

The fuel filler opening attachment hole 37 of a substantially circular shape, to which the fuel filler opening 9*a* (see FIG. 3) is attached, is formed in the bottom surface 35*a* of the adapter body portion 35. Bolt holes 37*a* used for attaching the fuel filler opening 9*a* are formed around the fuel filler opening attachment hole 37.

Meanwhile, a support portion 39*a* for the hinge 6 (see FIG. 4) is formed on the side wall 39 forward of the adapter body portion 35. Bolt holes 39*a*1 used for attaching the hinge 6 (see FIG. 4) are formed in this support portion 39*a*.

The opening rim 36 of this embodiment takes on a substantially rectangular shape in lateral view from the outer side in the vehicle width direction. A peripheral groove 34 to be filled with a sealer material is formed on an end surface of the above-mentioned opening rim 36 which will face the outer panel 4 (see FIG. 5).

This peripheral groove 34 to be filled with the sealer material continuously extends along the opening rim 36 except a cutout portion 34*a* to be described in detail later.

Figure 6:
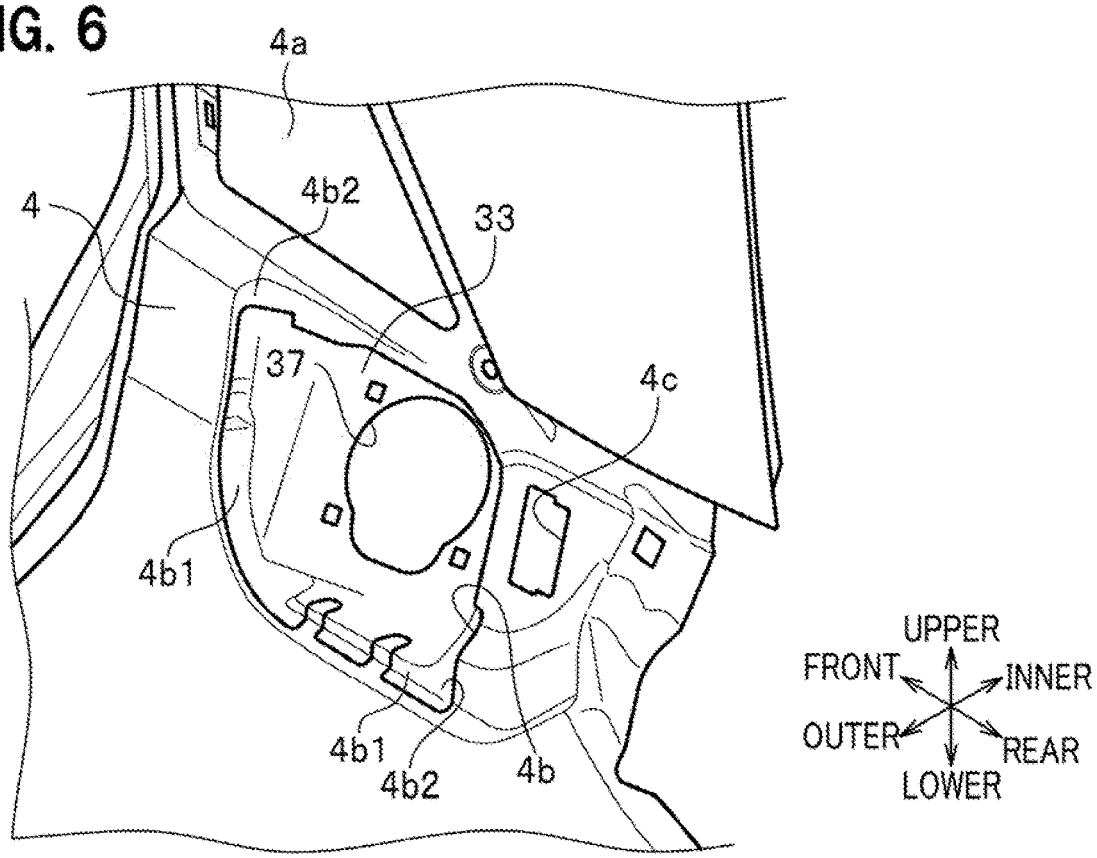
FIG. 6 is a partially enlarged perspective view showing a state of the adapter attached to a position corresponding to an adapter opening formed in an outer panel.

As shown in FIG. 6, the adapter 33 is connected from the inner side in the vehicle width direction of the outer panel 4 to the back surface of the outer panel 4. In this instance, the adapter 33 is attached through the adapter opening 4*b* formed in the outer panel 4 in such a way that the fuel filler opening attachment hole 37 faces the outer side in the vehicle width direction.

Here, the adapter opening 4*b* of this embodiment includes a wall portion 4*b*1 which is formed by being bent inward in the vehicle width direction from a general surface of the outer panel 4.

The adapter 33 is connected to the outer panel 4 through a portion around the above-described adapter opening 4*b*. Specifically, the adapter 33 interposes a sealer material, which is put in the peripheral groove 34 to be filled with the sealer material (see FIG. 5), between the adapter 33 and the outer panel 4, and is spot welded to the outer panel 4 at predetermined locations.

In this instance, a portion of the opening rim 36 (see FIG. 5) of the adapter 33 disposed in such a way as to step on an internal angle side across a corner portion 4*b*2 that is formed by use of the wall portion 4*b*1 at the adapter opening 4*b* shown in FIG. 6 constitutes the cutout portion 34*a* (see FIG. 5) where the peripheral groove 34 to be filled with the sealer material (see FIG. 5) is disconnected.

The opening rim 36 of the adapter 33 provided with the cutout portion 34*a* as described above can set a smaller distance to the outer panel 4 at the corner portion 4*b*2. Thus, it is possible to spread the sealer material favorably at the corner portion 4*b*2.

Note that reference sign 4*a* in FIG. 6 denotes an attachment opening for the quarter window 1 (see FIG. 1), which is formed at a portion of the outer panel 4 located above the adapter opening 4*b*. Meanwhile, reference sign 4*c* therein denotes an attachment opening for the push lifter 8 (see FIG. 3), which is formed at a portion of the outer panel 4 located rearward of the adapter opening 4*b*.

Incidentally, although illustration is omitted, the support portion 39*a* (see FIG. 5) for the hinge 6 (see FIG. 4) for the adapter 33 attached to the outer panel 4 will be disposed on the inner side in the vehicle width direction of the outer panel 4 that is located forward of the adapter opening 4*b* shown in FIG. 6.

Moreover, as shown in FIG. 3, part of a front side 33*a* of the adapter 33 is disposed adjacent to and in line with the upper rear edge 7*a* in the vicinity of a boundary between the upper rear edge 7*a* and the lower rear edge 7*b* at the rear door opening 5.

Thus, the hinge 6 (see FIG. 4) of this embodiment is also disposed adjacent to the rear door opening 5.

As described above, the quarter window 1 (see FIG. 1) and the lid 3 (see FIG. 1) attached to the outer panel 4 (see FIG. 1) are arranged integrally with the rear light 2 (see FIG. 1) on the side surface at a rear part of the vehicle body.

Figure 7:
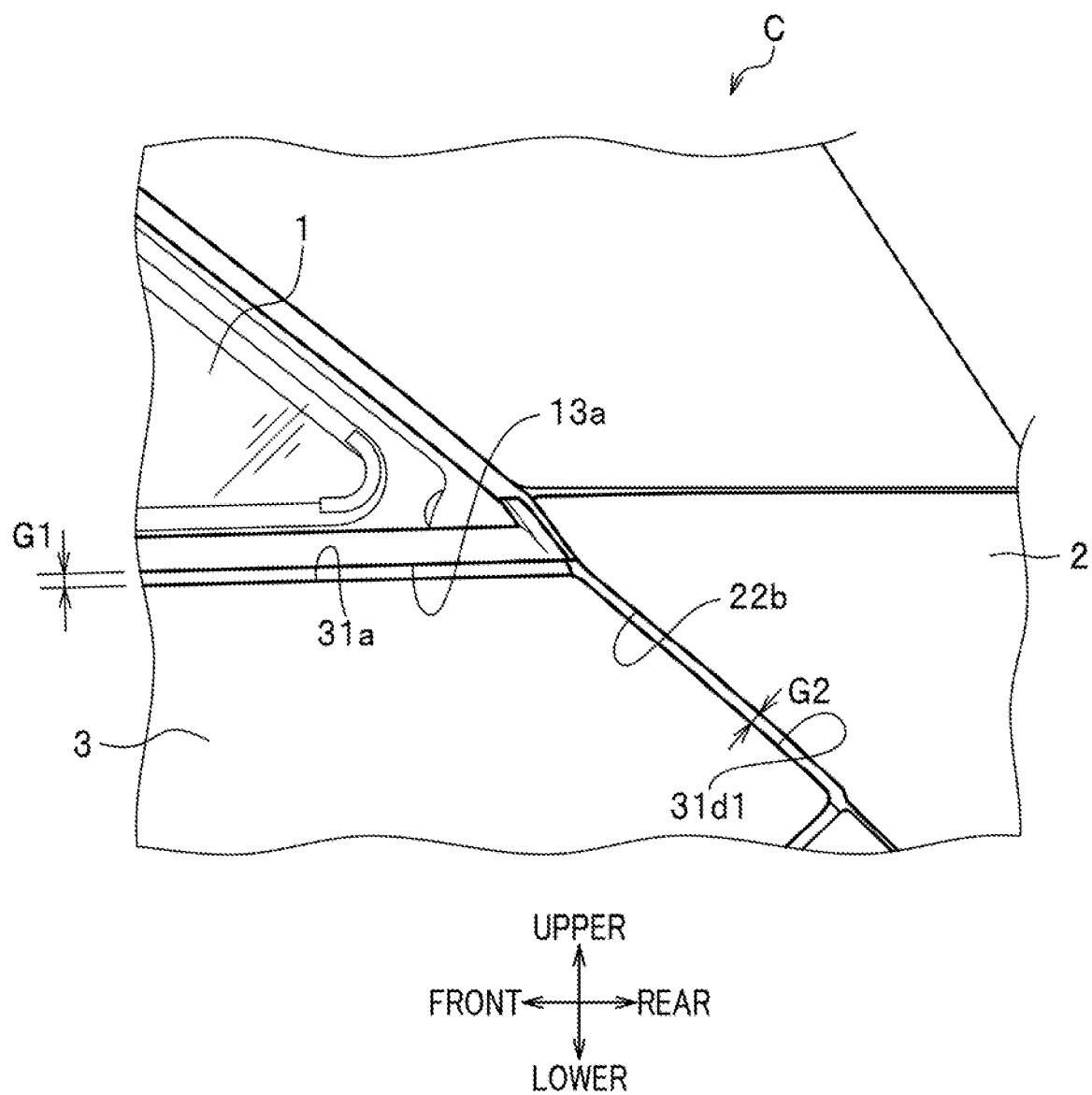
FIG. 7 is a partially enlarged diagram of a portion indicated with an arrow VII in FIG. 1.

FIG. 7 is a side view of the vehicle body side structure C of this embodiment, which is a partially enlarged diagram of a portion indicated with an arrow VII in FIG. 1.

As shown in FIG. 7, in the vehicle body side structure C of this embodiment, a gap G1 that extends in the front-rear direction of the vehicle body is formed by the upper side 31*a* of the lid 3 and the lower side 13*a* of the quarter window 1.

Meanwhile, in the vehicle body side structure C of this embodiment, a gap G2 that extends in the up-down direction of the vehicle body is formed by the front side 22*b* of the rear light 2 and the upper rear side 31*d*1 of the lid 3.

Moreover, the gap G2 between the rear light 2 and the lid 3 is joined to the gap G1 between the quarter window 1 and the lid 3.

Here, the lower side 13*a* of the quarter window 1 of this embodiment is defined by the lower end surface 12*b*1 (see FIG. 2) of the lip portion 12*b* (see FIG. 2) serving as the parting line of the molding member 12 as described above.

Meanwhile, the upper side 31*a* of the lid 3 is defined by the upper surface 31*a*1 (see FIG. 2) which is formed by being bent inward in the vehicle width direction.

Moreover, the gap G1 is formed between the lower end surface 12*b*1 of the lip portion 12*b* and the upper surface 31*a*1 of the lid 3 as shown in FIG. 2.

The above-mentioned gap G1 is formed such that the lid 3 is disposed adjacent to the quarter window 1 to the extent not to interfere with the quarter window 1 when the lid 3 is opened and closed and without interposing other members in between.

Meanwhile, it is possible to set the gap G1 equivalent to a gap between a lid and an outer panel or equivalent to a gap between a quarter window and the outer panel in a conventional vehicle on the premise that the lid 3 does not interfere with the quarter window 1 when the lid 3 is opened and closed.

In the meantime, it is also possible to set the gap G2 equivalent to the gap between the lid and the outer panel or equivalent to the gap between the quarter window and the outer panel in the conventional vehicle on the premise that the lid 3 does not interfere with the rear light 2 when the lid 3 is opened and closed.

<Operation and Effect>

Next, a description will be given of operation and effect provided by the vehicle body side structure C of this embodiment.

The vehicle body side structure C of this embodiment forms the gap G1 by using the upper side 31a of the lid 3 and the lower side 13a of the quarter window 1.

Thus, in the vehicle body side structure C, the parting line is unified without interposing any members between the lid 3 and the quarter window 1. According to the above-described vehicle body side structure C, it is possible to reduce air resistance when the vehicle is moving while improving a design of the vehicle at the same time.

Meanwhile, this vehicle body side structure C forms the gap G2 by using the front side 22b of the rear light 2 and the upper rear side 31d1 of the lid 3. Moreover, the gap G2 between the rear light 2 and the lid 3 is joined to the gap G1 between the quarter window 1 and the lid 3.

According to the above-described vehicle body side structure C, the parting line is unified without interposing any members between the lid 3 and the rear light 2. In this way, the vehicle body side structure C can further improve the design of the vehicle and further reduce the air resistance when the vehicle is moving.

Moreover, in the vehicle body side structure C, the molding member 12 of the quarter window 1 includes the extending portion 12c that overlaps the inner side in the vehicle width direction of the upper side 31a of the lid 3.

According to the above-described vehicle body side structure C, the extending portion 12c of the molding member 12 functions as a cushioning member (cushion rubber) when turning the lid 3 in the closing direction. In this way, the vehicle body side structure C does not have to be provided with an independent cushioning member for the lid 3 and can thus reduce the number of components.

In the meantime, according to the above-described vehicle body side structure C, it is possible to block inflow of air into the lid 3 while the vehicle is moving since the upper side 31a of the lid 3 overlaps the extending portion 12c. In this way, the vehicle body side structure C can further reduce the air resistance when the vehicle is moving.

Meanwhile, in the vehicle body side structure C, the front side 33a of the adapter 33 is disposed close to the rear door opening 5.

According to the vehicle body side structure C, it is possible to secure a large area of the lid 3 since the hinge 6 can be disposed close to the rear door opening 5. Thus, the vehicle body side structure C improves operability when opening and closing the lid 3 as well as operability of the filler cap 9b and the like.

Meanwhile, in the vehicle body side structure C, the spindle 6a of the hinge 6 is inclined such that the distance from the front side 31b of the lid 3 gradually grows larger downward in rear view of the vehicle body (see reference sign L1 and reference sign L2 in FIG. 1).

According to the above-described vehicle body side structure C, it is possible to prevent the lid 3 from interfering with the outer panel 4 that bulges outward in the vehicle width direction when the lid 3 is opened and closed.

In the vehicle body side structure C of this embodiment, the lower side of the spindle 6a of the hinge 6 is shifted outward in the vehicle width direction as compared to the upper side thereof. Thus, in the vehicle body side structure C, the lid 3 is opened in such a way as to be turned obliquely upward to the outer side in the vehicle width direction in rear view of the vehicle body.

According to the above-described vehicle body side structure C, when the lid 3 is set in the lid locating portion 4f, the lid 3 in the open state disposed obliquely above on the outer side in the vehicle width direction is turned obliquely downward to the inner side in the vehicle width direction. Thus, the lid 3 is easily turned in the closing direction by using its own weight.

Meanwhile, in the vehicle body side structure C, when the lid 3 in the open state located obliquely above on the outer side in the vehicle width direction is turned further forward, the lid 3 swings backward in such a way as to maintain the open state by using its own weight. Accordingly, it is possible to curtail a biasing unit previously provided to a conventional lid device in order to retain an open state of a lid.

In the vehicle body side structure C of this embodiment, the attachment opening 4c for the push lifter 8 is formed at a position rearward of the adapter opening 4b. In other words, the adapter opening 4b and the attachment opening 4c for the push lifter 8 are separately formed in the outer panel 4.

This vehicle body side structure C can reduce the adapter 33 in size unlike the one in which an attachment for the push lifter 8 is integrated with the adapter 33. As a consequence, the adapter opening 4b formed in the outer panel 4 is reduced in size.

According to the above-described vehicle body side structure C, it is possible to reduce the size of the adapter opening 4b which is disposed below and adjacent to the relatively large attachment opening 4a for the quarter window 1 formed in the outer panel 4, and thus to suppress stiffness degradation of the outer panel 4.

In the vehicle body side structure C of this embodiment, the push lifter 8 can be located rearward of the vehicle relative to the adapter 33, so that the push lifter 8 can be attached to a position far from the hinge 6. In this way, the vehicle body side structure C is capable of securing the large lid 3 in the front-rear direction of the vehicle body and is excellent in operability of the enlarged lid 3 when setting the lid 3 in the lid locating portion 4f.

Meanwhile, the vehicle body side structure C of this embodiment enables direct attachment of the push lifter 8 to the outer panel 4 provided with the lid locating portion 4f unlike the one configured to attach the push lifter 8 to the adapter 33 on the inner side of the outer panel 4.

According to the above-described vehicle body side structure C, the push lifter 8 is attached directly to the outer panel 4. This configuration precludes at least the necessity of positional adjustment of the push lifter 8 through the adapter 33.

In the vehicle body side structure C of this embodiment, the lid 3 is pressed inward in the vehicle width direction against the biasing force of the push lifter 8 so as to set the lid 3 in the lid locating portion 4f formed in the outer panel 4 when the lid 3 is opened and closed.

When the lid 3 is pressed as mentioned above, a larger load is applied to the lid 3 as the lid 3 is pressed at a position farther from the push lifter 8.

On the other hand, in the vehicle body side structure C of this embodiment, the push lifter 8 is disposed at the position corresponding to the expanded portion 32 of the lid 3.

According to the above-described vehicle body side structure C, the user can reduce the load to be applied to the lid 3 by pressing the expanded portion 32. This also makes it possible to keep the lid 3 from bending.

In the vehicle body side structure C of this embodiment, the shape of the expanded portion 32 of the lid 3 is asymmetrical to the shape of the front part of the lid 3.

According to the above-described vehicle body side structure C, the user can easily recognize the expanded portion 32 located at a position farther from the hinge 6. Thus, the user can identify a desirable position to press the lid 3 easily and open and lose the lid 3 with less force.

Meanwhile, in the vehicle body side structure C of this embodiment, the opening rim 36 of the adapter 33 is provided with the peripheral groove 34 that extends facing the inner side surface in the vehicle width direction of the outer panel 4. Moreover, in the vehicle body side structure C of this embodiment, the adapter opening 4b is provided with the wall portion 4b1 that is bent inward in the vehicle width direction from the general surface of the outer panel 4. In addition, the peripheral groove 34 is disconnected in the opening rim 36 of the adapter 33 at the position corresponding to the wall portion 4b1.

When the peripheral groove 34 is provided at the position where the opening rim 36 of the adapter 33 intersects with the wall portion 4b1 of the adapter opening 4b, the distance between the outer panel 4 and the opening rim 36 of the adapter 33 is increased at this position. Moreover, when the distance between the outer panel 4 and the opening rim 36 of the adapter 33 is increased, the sealer material to be interposed between the outer panel 4 and the opening rim 36 of the adapter 33 may fail to spread sufficiently.

On the other hand, in the vehicle body side structure C of this embodiment, the peripheral groove 34 is disconnected at the position where the opening rim 36 of the adapter 33 intersects with the wall portion 4b1 of the adapter opening 4b. Accordingly, the distance between the outer panel 4 and the opening rim 36 of the adapter 33 is reduced. As a consequence, the sealer material sufficiently spreads between the outer panel 4 and the opening rim 36 of the adapter 33.

While a certain embodiment of the present invention has been described above, it is to be understood that the present invention is not limited only to the above-described embodiment and can be carried out in various other modes within the range not departing from the scope of the present invention.

What is claimed is:

1. A vehicle body side structure comprising:
   a lid openably and closably attached to a side surface of a vehicle body rear part; and
   a quarter window provided at a position rearward of a rear door opening, wherein
   a gap extending in a front-rear direction of a vehicle body is formed by an upper side of the lid extending in the front-rear direction of the vehicle body and a lower side of the quarter window extending in the front-rear direction of the vehicle body.

2. The vehicle body side structure according to claim 1, further comprising:
   a rear light provided on the side surface of the vehicle body rear part, wherein
   a gap extending in an up-down direction of the vehicle body is formed by a front side of the rear light extending in the up-down direction of the vehicle body and a rear side of the lid extending downward from a rear end of the upper side of the lid, and
   the gap formed by the rear light and the lid is joined to the gap formed by the quarter window and the lid.

3. The vehicle body side structure according to claim 1, wherein
   the quarter window includes
   a quarter window glass member, and
   a molding member trimming a periphery of the quarter window glass member, and
   the molding member includes
   a lip portion forming a parting line at the lower side of the quarter window, and
   an extending portion located on an inner side in a vehicle width direction relative to the lip portion and to the upper side of the lid and extending down below the upper side of the lid.

4. The vehicle body side structure according to claim 1, further comprising:
   an adapter disposed on an inner side of an outer panel and provided with a hinge for the lid, the outer panel forming the side surface of the vehicle body rear part at a position rearward of the rear door opening, wherein
   the hinge is disposed adjacent to a front side of the adapter extending in an up-down direction of the vehicle body, and
   at least part of the front side of the adapter is disposed close to and in line with the rear door opening.

5. The vehicle body side structure according to claim 4, wherein
   a portion of the outer panel located forward of the lid and adjacent to the lid bulges outward in a vehicle width direction, and
   a distance between a spindle of the hinge and a front side of the lid grows larger downward in lateral view of the vehicle body, the front side of the lid extending downward from a front end of the upper side of the lid.

6. The vehicle body side structure according to claim 4, wherein the spindle of the hinge is inclined such that a lower part of the spindle is gradually displaced outward in a vehicle width direction in rear view of the vehicle body.

7. The vehicle body side structure according to claim 4, further comprising:
   a push lifter for the lid, wherein
   the outer panel is provided with
   an attachment opening for the quarter window,
   an adapter opening configured to cause at least part of the adapter to face an outer side in the vehicle width direction, and
   an attachment opening for the push lifter disposed rearward of the adapter opening in such a way as to correspond to a rear part of the lid.

8. The vehicle body side structure according to claim 7, wherein
   the lid includes an expanded portion extending from an outer side in a vehicle width direction of a rear end of the adapter to a front side of a rear light provided on the side surface of the vehicle body rear part, and
   the push lifter is disposed on an inner side in the vehicle width direction of the expanded portion.

9. The vehicle body side structure according to claim 8, wherein a shape of the expanded portion of the lid is asymmetrical to a shape of a front part of the lid.

10. The vehicle body side structure according to claim 7, wherein
    a peripheral groove to be filled with a sealer material is formed on a periphery of the adapter in such a way as to extend facing an inner side surface in a vehicle width direction of the outer panel, the adapter opening includes a wall portion formed by being bent inward in the vehicle width direction from a general surface of the outer panel forming the side surface of the vehicle body rear part, and the peripheral groove to be filled with the sealer material is disconnected on the periphery of the adapter at a position corresponding to the wall portion.

* * * * *